Aug. 31, 1926.

E. J. HALL

PISTON PIN RETAINER

Filed April 18, 1923

1,597,969

INVENTOR.
Elbert J. Hall
BY
ATTORNEYS.

Patented Aug. 31, 1926.

1,597,969

UNITED STATES PATENT OFFICE.

ELBERT J. HALL, OF BERKELEY, CALIFORNIA.

PISTON-PIN RETAINER.

Application filed April 18, 1923. Serial No. 632,915.

This invention relates to retainers for piston pins.

The retainer of the present invention serves to prevent longitudinal movement of the piston pin and may also be used to hold the pin against rotation with relation to the piston.

Retainers for piston pins have hitherto consisted of some sort of fastener arranged on the inner side of the piston, which, under vibration of the piston, was liable to become loose and fall into the crank case, thereby causing serious trouble. The present retainer is fitted on to the outside of the piston and is held against dislodgment by engagement with the wall of the cylinder. It cannot, therefore, become loose and fall into the crank case, and, moreover, it is easily inserted and removed when the piston is not in place within the cylinder.

Generally, the retainer of the present invention consists of a plug adapted to be fitted into the opening in the piston through which the pin is inserted. This plug on its face next to the cylinder is finished on the same radius as the piston and is held in place by engagement with the cylinder wall. Projections or wings are formed on the plug and enter recesses in the piston to prevent rotation of the plug in its seat. Since it is sometimes desirable to lock the pin against turning one or more of these retainers may be provided with lugs on its inner face to enter slots in the end of the piston pin.

In the accompanying drawing—

Figure 1:
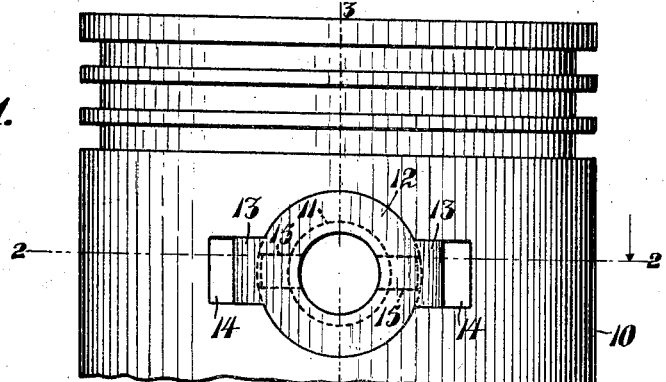
Fig. 1 shows a side elevation of a portion of a piston fitted with a retainer embodying my invention.
Figure 2:
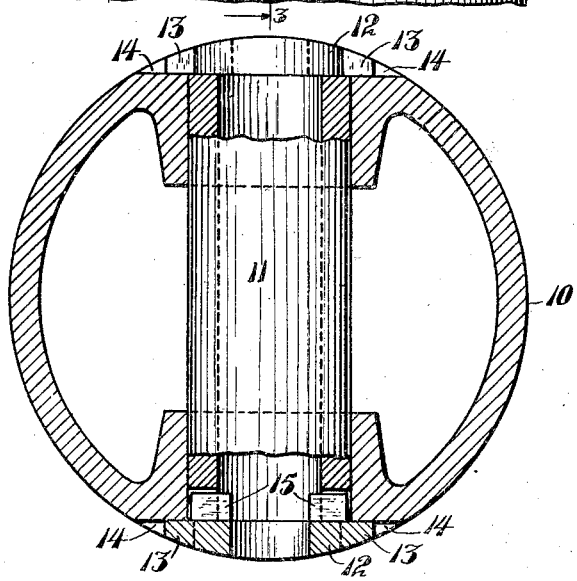
Fig. 2 shows a sectional view through the piston taken on the line 2—2 of Fig. 1.
Figure 3:
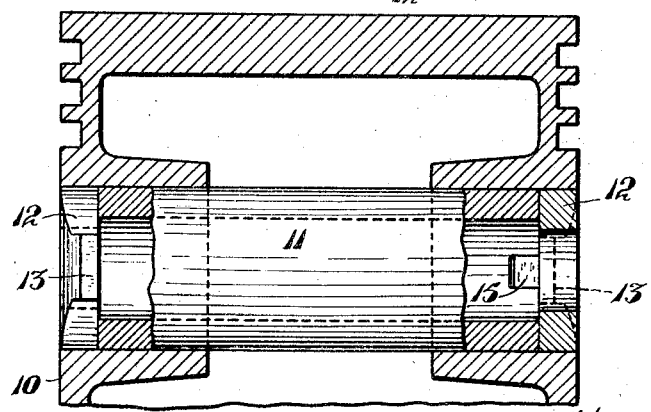
Fig. 3 shows a sectional view through the piston taken on the line 3—3 of Fig. 1.

I show a piston 10 fitted with a pin 11. At each side of the piston and fitted in the opening through which the pin is inserted is a retainer 12, preferably of brass or bronze. Each retainer is in the form of a cylindrical plug made flat on its inner face and having its outer face finished on the same radius as the piston. The plug is of a size and shape to fit snugly in the opening in the piston and to engage at its inner face with the end of the pin and having its outer face flush with the periphery of the piston. Wings 13 are formed on each plug and these enter recesses 14 in the piston whereby to prevent turning of the plug in its seat.

Where it is desired to prevent the pin from turning in the piston I provide the plug with lugs 15 on its inner face and form slots in the end of the pin to receive these lugs. It will be understood that the bearing surfaces between the pin and the piston do not get as much oil as the bearing surfaces between the pin and connecting rod, and, therefore, it is important, where dirt is present, to lock the pin against turning in the piston in order to prevent undue wear. As shown in the drawing, only one of the retainers need be provided with these lugs 15.

As above pointed out, this type of retainer cannot work loose and fall into the crank case, inasmuch as it is held in place by contact with the walls of the cylinder. Being finished on the same radius as the piston, the retainer cannot score or mar the cylinder walls. It is easily inserted or removed when the piston is not in place within the cylinder. It is also to be noted that the pin is in no wise weakened where a retainer of this type is employed.

The retainer should be made of the same material as the piston, or, at least, should have the same coefficient of expansion in order that the fit of the retainer within its socket shall remain the same under different temperature conditions. This is especially important when dealing with pistons made of aluminum.

Various changes in the construction and arrangement of the several parts herein shown and described may be employed without departing from the spirit of my invention as disclosed in the appended claims.

Having thus described my invention, what I claim and desire to secure by Letters Patent is:

1. The combination with a piston and its pin of a retainer for the pin comprising a cylindrical plug to enter the opening for the pin and having wings to enter recesses in the piston to prevent rotation of the plug, said plug being adapted to contact with the cylinder wall, and lugs formed on the inner face of the plug for interlocking engagement with the pin.

2. A piston pin retainer comprising a plug having a substantially flat inner face and an arcuate outer face, laterally extending projections on the plug to prevent turning of the plug in its seat and lugs formed on the inner face of the plug for interlocking engagement with the pin.

ELBERT J. HALL.